US009325555B2

(12) United States Patent
Kim et al.

(10) Patent No.: US 9,325,555 B2
(45) Date of Patent: Apr. 26, 2016

(54) METHOD AND DEVICE FOR TRACKING SYNCHRONIZATION

(71) Applicant: LG ELECTRONICS INC., Seoul (KR)

(72) Inventors: Hakseong Kim, Anyang (KR); Hanbyul Seo, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/380,558

(22) PCT Filed: Feb. 25, 2013

(86) PCT No.: PCT/KR2013/001488
§ 371 (c)(1),
(2) Date: Aug. 22, 2014

(87) PCT Pub. No.: WO2013/125925
PCT Pub. Date: Aug. 29, 2013

(65) Prior Publication Data
US 2015/0304149 A1    Oct. 22, 2015

Related U.S. Application Data

(60) Provisional application No. 61/602,600, filed on Feb. 24, 2012, provisional application No. 61/612,389, filed on Mar. 18, 2012.

(51) Int. Cl.
H04L 7/00       (2006.01)
H04L 27/26      (2006.01)
H04W 56/00      (2009.01)
H04J 11/00      (2006.01)

(52) U.S. Cl.
CPC ............ *H04L 27/2662* (2013.01); *H04J 11/00* (2013.01); *H04W 56/00* (2013.01); *H04W 56/002* (2013.01)

(58) Field of Classification Search
CPC ............ H04L 27/2662; H04L 27/2656; H04L 27/2695; H04L 27/2621; H04L 7/08; H04W 56/00; H04W 56/001; H04W 56/0035; H04W 56/0045; H04J 3/0682; H04J 13/0066
USPC .......... 375/354, 356, 362–366, 371; 370/504, 370/509–514, 516
See application file for complete search history.

(56) References Cited

U.S. PATENT DOCUMENTS

2006/0104257 A1    5/2006  Laroia et al.
2008/0008082 A1*   1/2008  Ma ..................... H04L 27/2675
                                                            370/203
(Continued)

FOREIGN PATENT DOCUMENTS

EP    2164217 A1    3/2010
EP    2405695 A1    1/2012
(Continued)

*Primary Examiner* — Tesfaldet Bocure
(74) *Attorney, Agent, or Firm* — Birch, Stewart, Kolasch & Birch, LLP

(57) ABSTRACT

Provided are a method and device for tracking synchronization between apparatuses in a wireless communication system. A receiving apparatus receives, from a transmitting apparatus, a tracking signal in a subframe, and the received tracking signal is used in order to estimate the timing offset between the transmitting apparatus and the receiving apparatus. The tracking signal is received in the last OFDM symbol of the subframe, and the last OFDM symbol contains a sequence that is repeated N (N>1) times.

10 Claims, 9 Drawing Sheets

(56) References Cited

U.S. PATENT DOCUMENTS

| | | | | |
|---|---|---|---|---|
| 2009/0304128 A1* | 12/2009 | Izumi | .................. | H04L 7/042 375/343 |
| 2010/0020905 A1* | 1/2010 | Mansour | ............. | H04J 13/0062 375/343 |
| 2010/0208656 A1* | 8/2010 | Oh | .................. | H04W 16/12 370/328 |
| 2011/0194401 A1* | 8/2011 | Akita | .................. | H04L 5/005 370/203 |

FOREIGN PATENT DOCUMENTS

| WO | WO 2010/108549 A1 | 9/2010 |
|---|---|---|
| WO | WO 2011/062990 A1 | 5/2011 |

\* cited by examiner

METHOD AND DEVICE FOR TRACKING SYNCHRONIZATION

CROSS REFERENCE TO RELATED APPLICATIONS

This application is the National Phase of PCT International Application No. PCT/KR2013/001488, filed on Feb. 25, 2013, which claims priority under 35 U.S.C. 119(e) to U.S. Provisional Application No. 61/602,600, filed on Feb. 24, 2012 and 61/612,389, filed on Mar. 18, 2012, all of which are hereby expressly incorporated by reference into the present application.

BACKGROUND OF THE INVENTION

1. Field of the Invention

The present invention relates to wireless communications, and more particularly, to a method and apparatus for tracking synchronization between wireless devices in a wireless communication system.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Device-to-device (D2D) communication is a distributed communication technique in which neighboring wireless nodes directly deliver direct traffic. In the D2D communication, a wireless node such as a mobile phone autonomously discovers another wireless node which is physically neighboring thereto, and establishes a communication session and thereafter transmits traffic. The D2D communication can solve a traffic overload problem by distributing traffic concentrated to a base station. The D2D technique such as Bluetooth or Wi-Fi Direct directly supports communication between the wireless nodes without an aid of the base station.

It is necessary to consider a propagation delay between the wireless nodes when the D2D communication is designed. Although the Bluetooth supports data communication between wireless nodes separated by up to 100 m, an actual effective range is far less than that. When a distance between the wireless nodes is more increased, it is necessary to consider a path loss and a timing advance.

SUMMARY OF THE INVENTION

The present invention provides a method and apparatus for tracking synchronization between wireless devices.

In an aspect, a method for tracking synchronization between devices in a wireless communication system is provided. The method includes receiving, by a receiver, a tracking signal in a subframe from a transmitter, and estimating, by the receiver, a timing offset between the transmitter and the receiver by using the received tracking signal. The subframe includes a plurality of orthogonal frequency division multiplexing (OFDM) symbols, the tracking signal is received in a last OFDM symbol of the subframe, and the tracking signal includes a sequence repeated N times (N>1) in the last OFDM symbol.

The method may further include receiving, by the receiver, information on a timing advance (TA) between the transmitter and a base station from the base station. The timing offset may be estimated based on the tracking signal and the TA.

The tracking signal may be repeated N times based on a Zadoff-Chu sequence.

In another aspect, a receiving apparatus for tracking synchronization between devices in a wireless communication system includes a signal receiver configured to receive a tracking signal in a subframe from a transmitter, and an offset estimator configured to estimate a timing offset between the transmitter and the receiving apparatus by using the received tracking signal.

Synchronization maintaining and synchronization tracking for communication between wireless devices are possible by considering a propagation delay.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-advanced (LTE-A). This is for exemplary purposes only, and thus the present invention is applicable to various communication systems. In the following description, LTE and/or LTE-A are collectively referred to as LTE.

The LTE system is not allowed for direct communication between wireless devices, and is scheduled by the BS. In order to distribute increasing data traffic, it is considered to support device-to-device (D2D) communication between the wireless devices without the BS or with the BS performing scheduling to a minimum extent.

Figure 1:
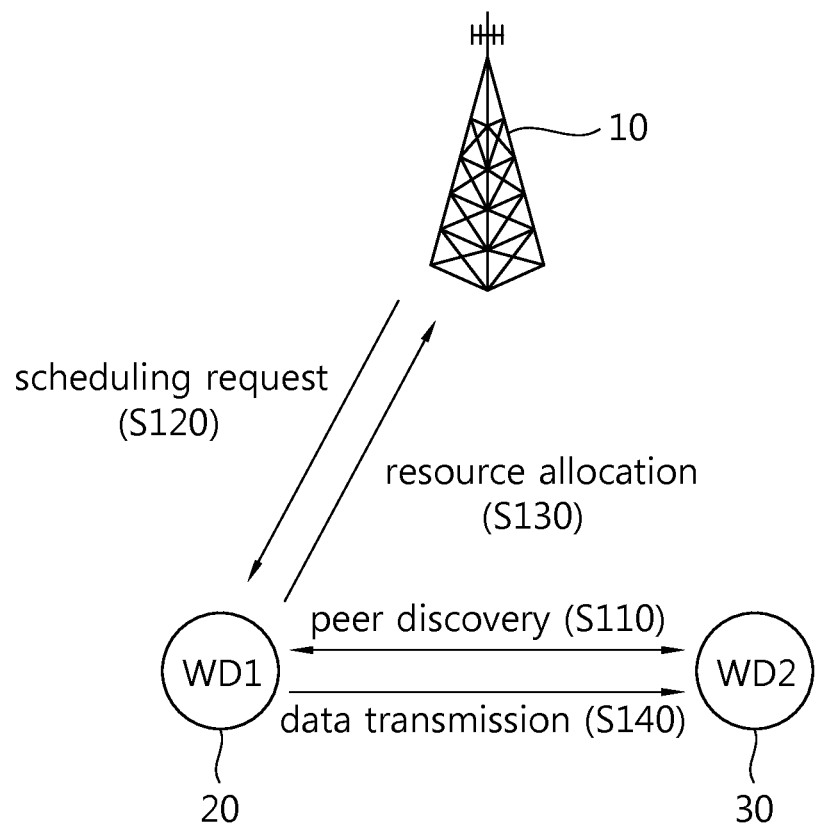
FIG. 1 shows an example of D2D communication.

FIG. 1 shows an example of D2D communication.

Each of a wireless device (WD)1 20 and a WD2 30 establishes a connection (e.g., a radio resource control (RRC) connection) with a BS 10.

The WD1 20 and the WD2 30 are located within a distance allowing communication with each other, and perform peer discovery to identify each other (step S110). For the peer discovery, the WD1 20 and the WD2 30 may broadcast an identification message including identification information thereof and/or a synchronization signal. The WD1 20 and the WD2 30 may periodically discover an identification message of a peer device, or may discover it at a request of the BS.

Although only two WDs 20 and 30 are considered herein, this is for exemplary purposes only. For clear understanding, it is described for example that the WD1 20 transmits data to the WD2 30.

The WD1 20 sends to the BS 10 a scheduling request for transmission to the WD2 30 (step S120). The scheduling request may include information regarding a channel state (e.g., a channel quality indicator (CQI), a timing difference, etc.) between the WD1 2Q and the WD2 30.

The BS 10 sends to the WD1 20 a resource allocation (step S130). The WD1 20 transmits to the WD2 30 a data packet based on the resource allocation (step S140).

Although it is described above that the D2D communication between the WDs is achieved by scheduling, the embodiment of the present invention may apply to direct communication between the WDs without an intervention of the BS.

For D2D communication, it is necessary to first adjust synchronization between peer WDs. After performing the synchronization, a connection is established between WDs. Thereafter, in order to overcome a communication problem depending on a timing jitter caused by a channel change or a difference in a propagation delay and synchronization situation between the WDs, it is required to persistently perform time/frequency synchronization tracking.

In the existing 3GPP LTE system, a cell-specific reference signal (CRS) is provided for tracking between a BS and a UE. However, the CRS is not defined in a UL subframe. This implies that tracking cannot be ensured between WDs if D2D communication is performed in the UL subframe.

Hereinafter, the subframe is a resource allocation unit including a plurality of orthogonal frequency division multiplexing (OFDM) symbols. A data packet may be transmitted in one or more OFDM symbols of the subframe. A time required for transmitting one subframe is defined as a transmission time interval (TTI). For example, one subframe may have a length of 1 millisecond (ms). Although it is described for example that the subframe includes 14 OFDM symbols, this is for exemplary purposes only.

Since the 3GPP LTE uses orthogonal frequency division multiple access (OFDMA) in a downlink (DL), the OFDM symbol is only for expressing one symbol period in the time domain, and there is no limitation in a multiple access scheme or a terminology. For example, the OFDM symbol may also be referred to as another terminology such as a single carrier frequency division multiple access (SC-FDMA) symbol, a symbol period, etc.

Figure 2:
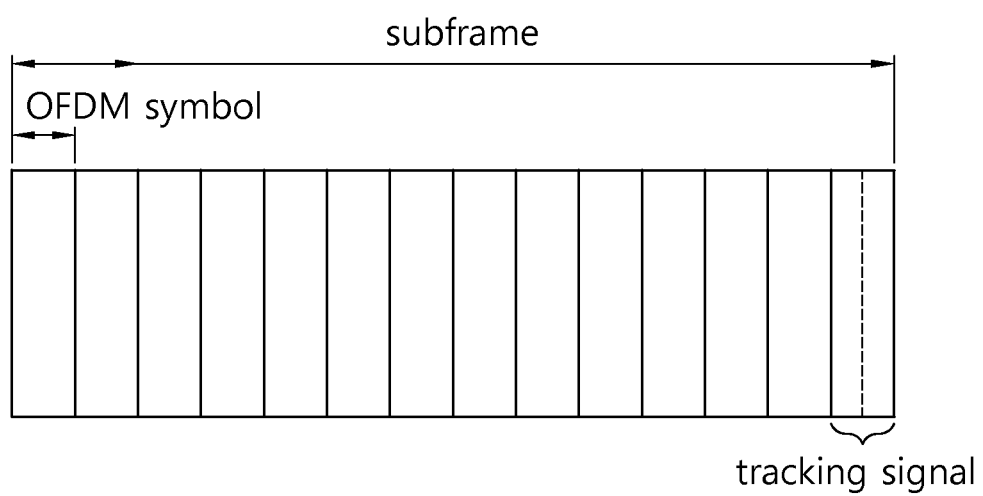
FIG. 2 shows a subframe structure for D2D communication according to an embodiment of the present invention.

FIG. 2 shows a subframe structure for D2D communication according to an embodiment of the present invention.

A subframe includes 14 OFDM symbols, and a tracking signal is transmitted in a last OFDM symbol.

The tracking signal may be used for synchronization adjustment or synchronization tracking between WDs. The term 'tracking signal' is for exemplary purposes only. The tracking signal is a signal which is known between the WDs, and is also called in various terms such as a reference signal, a channel state information (CSI) signal, a sounding signal, a tracking signal, a preamble, or a midamble.

Assume that the tracking symbol is an OFDM symbol in which the tracking signal is transmitted. The tracking symbol may change in location and number within a subframe. The tracking signal may be transmitted in first and last OFDM symbols. Alternatively, the tracking signal may be transmitted in at least one of 14 OFDM symbols.

The tracking signal may include a sequence repeated N times (N>1) in one OFDM symbol. It is shown in FIG. 2 that a sequence is repeated two times in a last OFDM symbol.

A well-known sequence such as a Zadoff-Chu sequence may be used as the tracking signal.

For example, a Zadoff-Chu sequence having a length Ns may be defined as follows.

$$r(n) = e^{-j\frac{\pi qm(m+1)}{Ns}} \quad \text{[Equation 1]}$$

Herein, q is a root index, and m=0, 1, . . . , Ns−1. Ns and q are relatively prime.

For another example, an uplink reference signal disclosed in the section 5.5.1 of 3GPP TS 36.211 V10.4.0 (2011-12) may be used as a tracking signal.

The tracking signal is transmitted by repeating a sequence N times in a time domain. For example, the tracking signal is a signal in which a sequence is repeated N times in 1 OFDM symbol.

Figure 3:
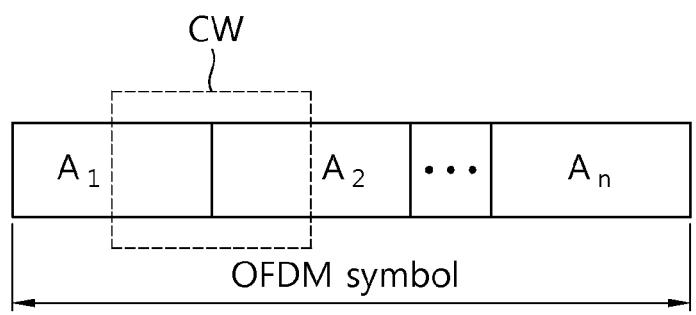
FIG. 3 shows an example of tracking using an N-times repeated sequence.

FIG. 3 shows an example of tracking using an N-times repeated sequence.

An (n=1, . . . , N) denotes one sequence, and the N-times repeated sequence is used as a tracking signal.

A problem of a timing jitter is easily solved by using the N-times repeated sequence. By using a repeated sequence feature, a receiver may analyze a signal taken during a capturing window (CW) at its reference point (e.g., a subframe boundary), and estimate how much cyclic shift value is changed in the received signal from a sequence transmitted by a transmitter, thereby being capable of tracking the timing jitter.

For example, assume that a Zadoff-Chu sequence is used and a receiver is aware of a base sequence (i.e., a root index and a cyclic shift value) of a synchronization signal to be transmitted by a transmitter. The receiver demodulates a sequence received at a subframe boundary. If a cyclic shift of the demodulated sequence is shifted by k, the receiver may calculate a timing difference corresponding to k and may adjust timing according thereto. It is advantageous to use the Zadoff-Chu sequence in this purpose since a timing difference in a time domain appears directly as a cyclic shift difference.

In addition, the receiver may report information on the measured timing difference to the transmitter and/or the BS. The BS or the transmitter may adjust or manage synchronization of communication between devices on the basis of the reported timing difference.

Sequences $A_1, A_2, \ldots, A_N$ may be all identical, or may be different. For example, when using the Zadoff-Chu sequence, the sequences $A_1, A_2, \ldots, A_N$ may be generated by varying a cyclic shift on the basis of an index n.

A power offset may be set among the sequences $A_1, A_2, \ldots, A_N$. For example, $A_1$ may be set to have a highest transmit power. On the contrary, $A_N$ may be set to have the highest transmit power.

The number of times of repetition may vary depending on a subframe or a system. The number of times of repetition may be changed periodically or at a request of the BS. For example, the number of times of repetition may be 2 times or 4 times in unit of 10 subframes.

Alternatively, the number of times of repetition may be changed according to whether D2D communication is scheduled by the BS. If scheduling is adjusted by the BS, it can be regarded that the WD has small synchronization error and shares basic information on a subframe boundary. WDs cannot know information of one another in an area outside a BS coverage, and thus there is a need to acquire much more information by using a tracking signal. Therefore, the number of times of repetition may be decreased within the BS coverage, and may be increased in the area outside the coverage. For example, it may be set such that N=2 within the BS coverage, and N>2 in the area outside the coverage.

The number of times of repetition may also vary in a subframe. For example, when a tracking signal is transmitted in first and last OFDM symbols of the subframe, the number of times of repetition may be 4 in the first OFDM symbol, and may be 2 in the last OFDM symbol.

Additional information may be included in a sequence according to a sequence's root index and/or cyclic shift value. Alternatively, the additional information may be included according to a scramble sequence for a repeated pattern and a repeated sequence (or initialization for a corresponding scramble sequence). The additional information may include at least any one of a transmitter's identifier, usage, decoding information, demodulation information, bandwidth, and MIMO information (rank, antenna port, etc.).

For synchronization tracking, more accurate measurement is possible when a WD is aware of a peer WD's timing advance (TA) captured by the WD.

Assume a case where the WD2 measures a timing offset of the WD1.

When the WD1 transmits data, the WD2 can know a UL TA (i.e., TA1) of the WD1. For example, the BS may report the TA1 to the WD2. If D2D communication is performed by using a UL subframe, the WD2 may estimate a UL subframe boundary of the WD1 on the basis of the TA1. The WD2 may estimate a timing difference caused by a delay by capturing a reception signal during a CW from a tracking symbol on the basis of the UL subframe boundary of the WD1.

Figure 4:
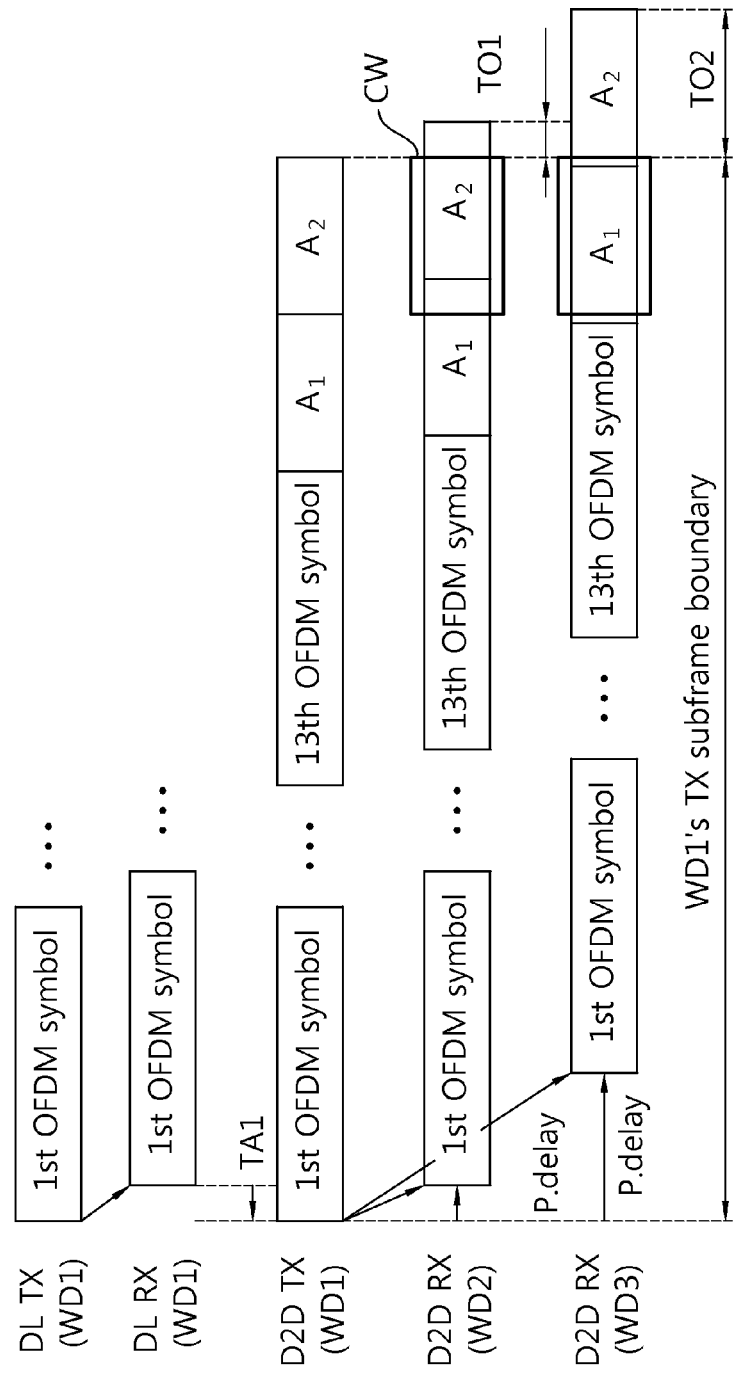
FIG. 4 shows an example of tracking according to an embodiment of the present invention.

FIG. 4 shows an example of tracking according to an embodiment of the present invention. As a tracking signal, a 2-times repeated sequence (i.e., $A_1$, $A_2$) is described for example.

TA1 is defined as a difference between DL transmission and DL reception of a WD1. A WD2 and a WD3 receive information on the TA1 from a BS.

The WD1 transmits a data packet to the WD2 and/or the WD3 through a UL subframe.

The WD2 obtains a transmission (TX) subframe boundary of the WD2 by reflecting the TA1. On the basis thereof, a capturing window is configured at a part of a tracking symbol (i.e., a last OFDM symbol). By comparing with a reference cyclic shift value, how much a phase/frequency is shifted from tracking sequence samples or how much delay there is in a time domain may be obtained. Therefore, the WD2 may obtain a timing offset TO1 between a TX subframe boundary of the WD1 and a Tx subframe boundary of the WD2.

Similarly, the WD3 may also obtain a timing offset TO2 between the Tx subframe boundary of the WD1 and a Tx subframe boundary of the WD3.

A CW of the WD2 and the WD3 may be different in size and location. The CW size may be determined according to WD's capability, channel state, etc., or may be given by the BS. The CW size may be set for each device, for each cell, or for each device group. If the CW size is set to ½ OFDM symbol, it means that measurement is possible up to a timing offset corresponding to a ½ symbol duration.

The WD may adjust the CW size according to a TA1. For example, the size may be adjusted variously to ½ OFDM symbol, ¼ OFDM symbol, ⅛ OFDM symbol, etc., according to the TA1.

The CW size may vary for each subframe. When a tracking signal is transmitted in consecutive subframes, all OFDM symbols between the consecutive subframes can be received, and thus the CW size can be increased. For example, when the CW size is ½ OFDM symbol in a non-consecutive subframe, the CW size may be changed to 1 OFDM symbol in the consecutive subframes.

Figure 5:
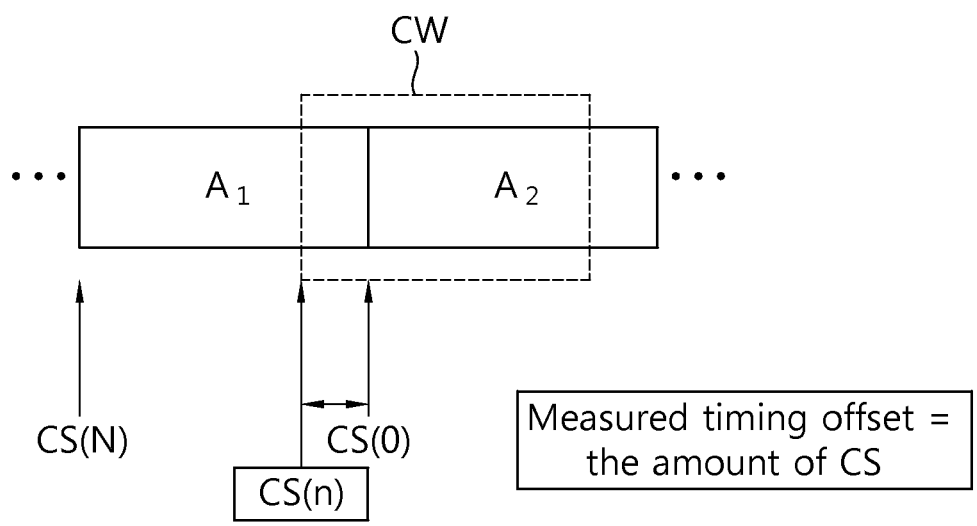
FIG. 5 shows an example of estimating a timing offset.

FIG. 5 shows an example of estimating a timing offset. As a tracking signal, a 2-times repeated sequence (i.e., $A_1$, $A_2$) is described for example.

By reversely assigning a cyclic shift (CS) index, the timing offset may be estimated from a CS index at which an actual correlation feature becomes a peak.

Figure 6:
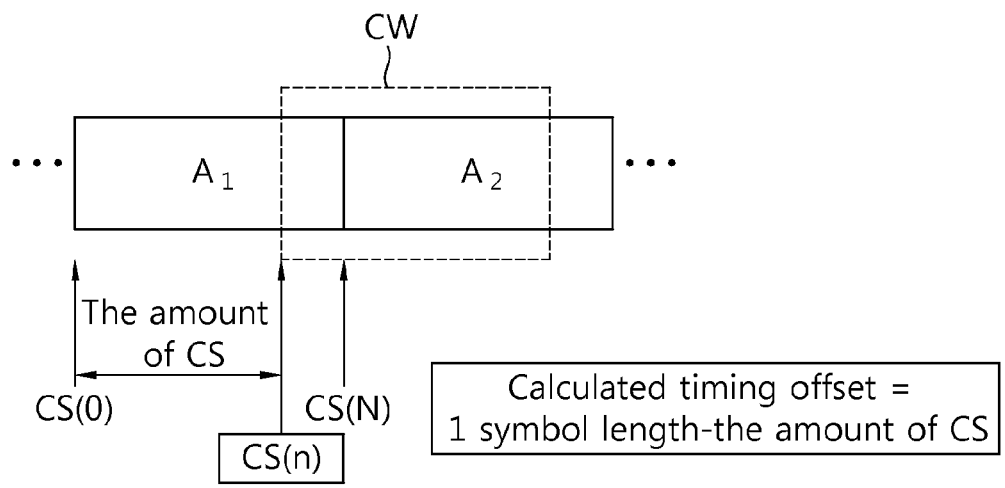
FIG. 6 shows another example of estimating a timing offset.

FIG. 6 shows another example of estimating a timing offset.

Comparing with the example of FIG. 5, a CS index is assigned in an ascending order. The timing offset is estimated by considering 1 OFDM symbol duration from an obtained CS index.

Figure 7:
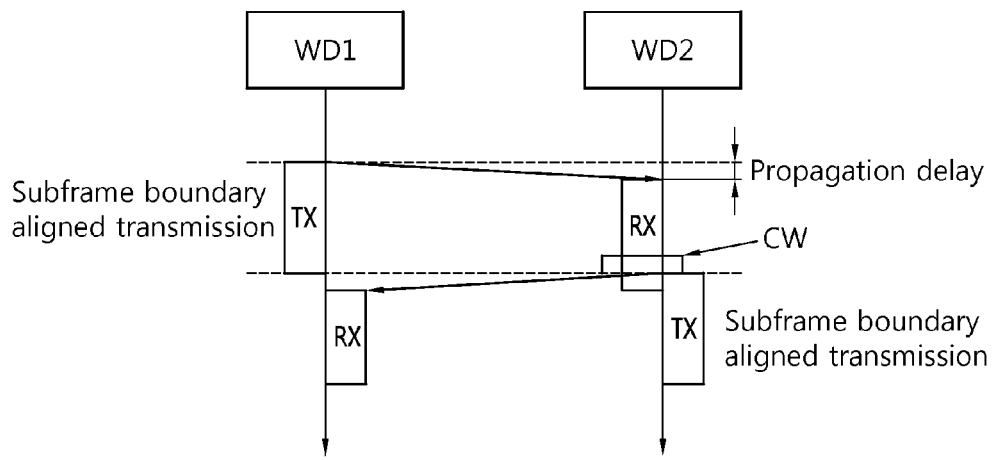
FIG. 7 is a flowchart showing a tracking method according to an embodiment of the present invention.

FIG. 7 is a flowchart showing a tracking method according to an embodiment of the present invention.

A WD1 adjusts UL/DL synchronization with a BS, and thus transmits a data packet to a WD2 by using a UL subframe. Scheduling for D2D transmission is as shown in the aforementioned embodiment of FIG. 1.

The WD2 receives a TA value of the WD1 and information on TA1 from the BS, and thus receives a CW and calculates a timing offset.

When the WD2 transmits a data packet to the WD1, it may transmit according to the calculated timing offset. The WD2 may report information on the timing offset to the WD1 or the BS.

As one method for facilitating the implementation, the timing offset may be obtained by transforming a capturing window to a frequency domain and thereafter multiplying a base sequence thereto. In doing so, there is an advantage in that a computation amount is decreased in comparison with a case of performing a convolution operation while cyclically shifting the base sequence in a time domain.

Figure 8:
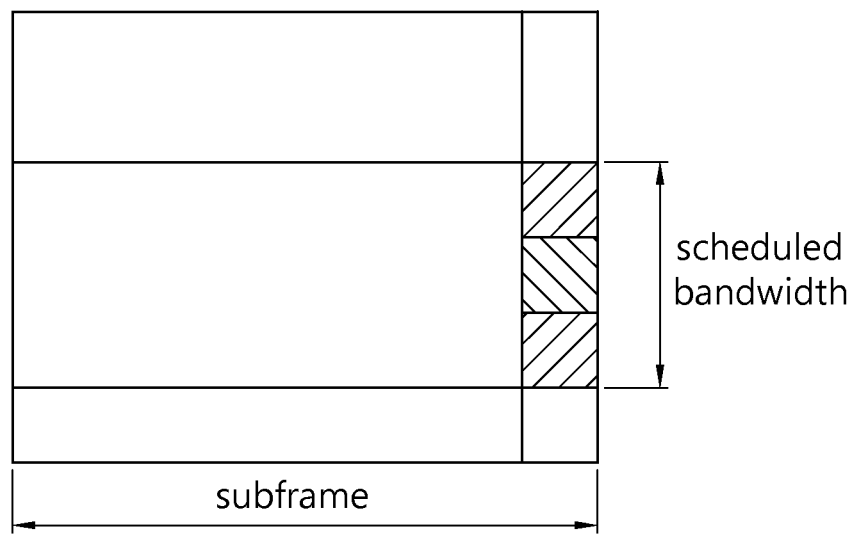
FIG. 8 shows a subframe structure according to another embodiment of the present invention.

FIG. 8 shows a subframe structure according to another embodiment of the present invention.

A WD transmits a tracking signal at a bandwidth scheduled by a BS. In this case, a band at which the tracking signal is transmitted is narrower than the scheduled bandwidth, and the remaining bands are used as a guard band (or a guard subcarrier). This is to protect the tracking signal from an interference caused by data transmission.

Figure 9:
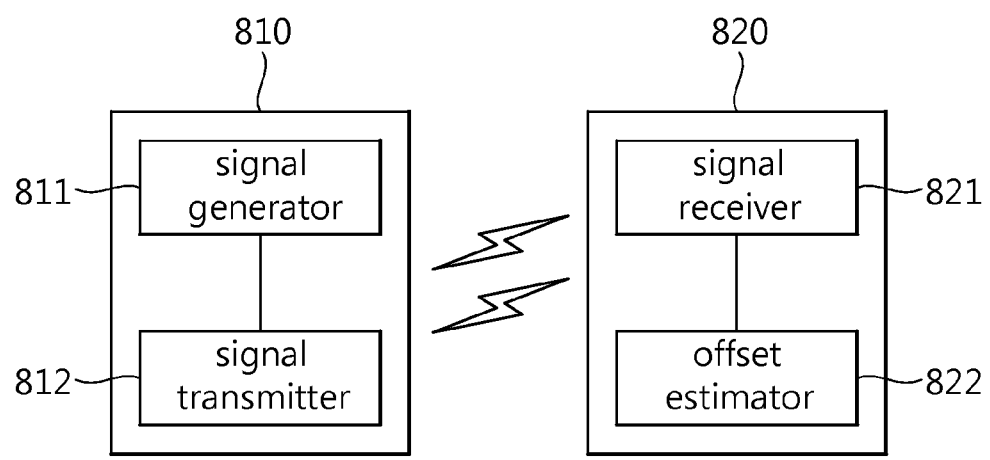
FIG. 9 is a block diagram showing a wireless communication system according to an embodiment of the present invention.

FIG. 9 is a block diagram showing a wireless communication system according to an embodiment of the present invention. A transmitting apparatus 810 and/or a receiving apparatus 820 may be a part of a WD for implementing the aforementioned embodiment.

The transmitting apparatus 810 includes a signal generator 811 and a signal transmitter 812. The signal generator 811 generates a tracking signal. The signal transmitter 812 transmits the tracking signal in a subframe. The signal transmitter 812 may transmit the tracking signal in the aforementioned subframe shown in FIG. 2 or FIG. 8.

The receiving apparatus 820 includes a signal receiver 821 and an offset estimator 822. The signal receiver 821 receives a tracking signal in a subframe. The offset estimator 822 estimates a timing offset on the basis of the tracking signal.

The signal generator 810, the signal transmitter 820, the signal receiver 821, and/or the offset estimator 822 may be implemented by a processor.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for tracking synchronization between devices in a wireless communication system, the method comprising:
   receiving, by a receiver and from a transmitter, a tracking signal in a subframe;
   receiving, by the receiver and from a base station, information on a timing advance (TA) between the transmitter and the base station; and
   estimating, by the receiver, a timing offset between the transmitter and the receiver by using the received tracking signal,
   wherein the subframe includes a plurality of orthogonal frequency division multiplexing (OFDM) symbols,
   wherein the tracking signal is received in a last OFDM symbol of the subframe,
   wherein the tracking signal includes a sequence repeated N times (N>1) in the last OFDM symbol, and
   wherein the timing offset is estimated based on the tracking signal and the TA.

2. The method of claim 1, wherein the tracking signal is received in a bandwidth scheduled by the base station.

3. The method of claim 2, wherein the subframe is used for uplink (UL) transmission between the transmitter and the base station.

4. The method of claim 1, wherein the timing offset is estimated by using a sequence captured during a capturing window from the received tracking signal.

5. The method of claim 4, wherein a size of the capturing window is adjusted according to a size of the TA.

6. The method of claim 4, wherein a size of the capturing window is ½ OFDM symbol.

7. The method of claim 1, wherein the tracking signal is repeated N times based on a Zadoff-Chu sequence.

8. The method of claim 7, wherein the tracking signal includes N sequences, and
   wherein the N sequences are generated by cyclically shifting the Zadoff-Chu sequence.

9. A receiving apparatus for tracking synchronization between devices in a wireless communication system, the receiving apparatus comprising:
   a signal receiver configured to:
      receive, from a transmitter, a tracking signal in a subframe, and
      receive, from a base station, information on a timing advance (TA) between the transmitter and the base station; and
   an offset estimator configured to estimate a timing offset between the transmitter and the receiving apparatus by using the received tracking signal,
   wherein the subframe includes a plurality of orthogonal frequency division multiplexing (OFDM) symbols,
   wherein the tracking signal is received in a last OFDM symbol of the subframe,
   wherein the tracking signal includes a sequence repeated N times (N>1) in the last OFDM symbol, and
   wherein the timing offset is estimated based on the tracking signal and the TA.

10. The receiving apparatus of claim 9, wherein the tracking signal is received in a bandwidth scheduled by the base station.

* * * * *